June 2, 1970

M. D. JONES 3,515,920

PERMANENT MAGNET INDUCTOR GENERATOR FOR VEHICLE
WHEEL SPEED SENSOR
Filed July 18, 1968

INVENTOR.
Malcolm D. Jones
BY
Harness, Dickey & Pierce
ATTORNEYS.

United States Patent Office 3,515,920
Patented June 2, 1970

---

3,515,920
PERMANENT MAGNET INDUCTOR GENERATOR FOR VEHICLE WHEEL SPEED SENSOR
Malcolm D. Jones, Belleville, Mich., assignor to Kelsey-Hayes Company, Romulus, Mich., a corporation of Delaware
Filed July 18, 1968, Ser. No. 745,860
Int. Cl. H02k 19/24, 21/44
U.S. Cl. 310—168                                    5 Claims

ABSTRACT OF THE DISCLOSURE

An electrical sensor for sensing rotational speed between a pair of relatively rotatable members with the sensor including a pair of relatively rotatable poles with one of the poles being a segmental toothed stator and with the other of the poles being a toothed ring shaped member and including a coil wound around a permanent magnet.

---

Summary background of the invention

The present invention relates to electrical speed sensors. In conventional sensors for sensing rotation, a toothed annular rotor has been provided and a stator has been used having a pair of pole faces which are located to alternately face teeth and gaps on the rotor; it has been found that by increasing the area of confrontation between rotor and stator and by providing a toothed structure with a large number of teeth on both rotor and stator, an efficient sensor can be provided. In many instances, a segmental sensor construction, i.e. one extending less than 360°, is desirable because of clearance requirements; it is believed, however, that for increased efficiency the stator and rotor should be in confrontation for at least around 30°.

Therefore, it is an object of the present invention to provide an improved sensor construction for sensing relative rotation between two relatively rotating members.

It is still another object of the present invention to provide a new and improved sensor construction of the above described type in which a segmental stator is used.

It is another object of the present invention to provide a novel and improved construction of the above described type in which the segmental stator is located on the fixed member in confrontation with the rotor are substantially less than 360° and for greater than 30°.

Figure 1:
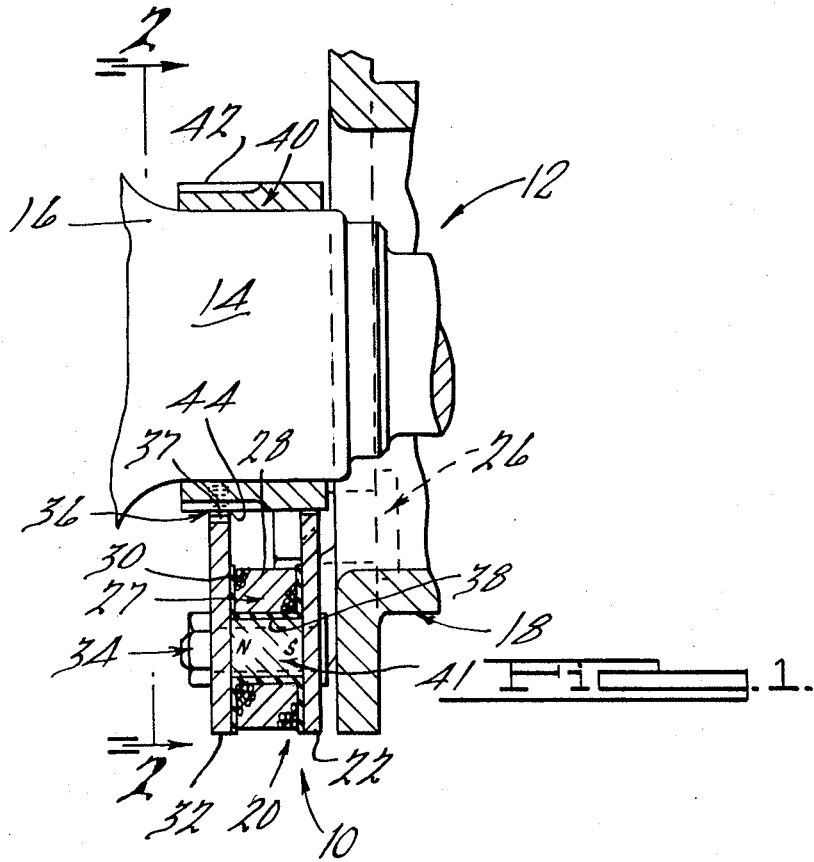
Figure 2:
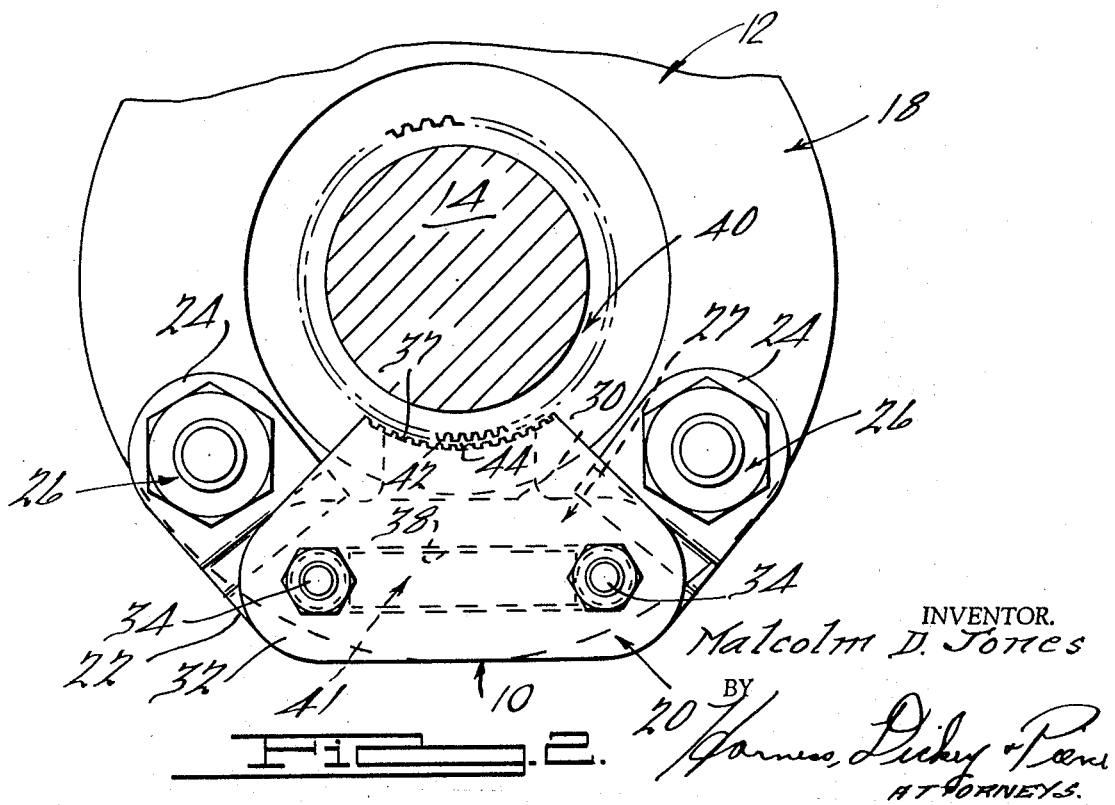

Other objects, features, and advantages of the present invention will become apparent from the subsequent description and the appended claims, taken in conjunction with the accompanying drawings, in which:

FIG. 1 is an elevational view with some parts shown in section and others broken away of a sensor assembly embodying features of the present invention; and FIG. 2 is a sectional view taken generally along the line 2—2 of FIG. 1.

Looking now to the drawing, a sensor assembly is generally indicated by the numeral 10 and is shown in asembly relationship with a rear axle assembly 12 which includes an axle shaft 14 which terminates at its outer end in a flange 16 to which a wheel assembly (not shown) can be mounted. The axle shaft 14 is rotatably mounted within an axle housing assembly 18 to which at least a portion of the sensor assembly 10 is mounted.

The sensor has a stator or fixed pole assembly 20 which is mounted at the outer end of the axle housing assembly 18. The stator assembly 20 includes a generally flat support plate member 22 which is provided with a pair of ears 24 through which the stator assembly 20 is secured to the flange of the axle housing 18 by a pair of fastener assemblies 26. The stator assembly 20 has a coil assembly 27 which includes an electrical coil 28, wound in a generally oblong fashion upon a plastic bobbin 30. The coil assembly 27 has a centrally located, longitudinally extending slot 38 in which is located a bar type permanent magnet member 41 which is of a polarity as indicated in FIG. 1 of the drawing. The coil assembly 27 is sandwiched between the support plate 22 and a stator member 32 and the entire assembly secured together by a pair of fastener assemblies 34. The stator plate 32 is generally flat and has an arcuate or circularly shaped toothed portion 36 extending for more than around 30° but substantially less than 360° and which faces radially towards the axle shaft 14 and has a plurality of axially extending teeth 37. Note that the stator assembly 20 is of a compact construction and is shown secured to the axle housing 18 at the radially lower portion thereof; however, a depending upon clearance problems it can be located conveniently at other locations around the periphery of the axle shaft 14. For increased output more than one stator assembly 18 could be used. A rotor 40 extends annularly about and is secured to the axle shaft 14 as by press fit and hence is rotatable therewith and is provided with a plurality of generally uniformly circumferentially distributed axially extending teeth 42. Both rotor 40 and stator 32 have a large number of teeth to provide for a signal having a high frequency. Thus as the axle shaft 14 is rotated and the rotor 40 is rotated relative to the stator plate 32, a signal will be generated in the coil 28 which is of a frequency indicative of the wheel speed of the vehicle. The teeth 37 on stator plate 32 are in confrontation with the teeth 42 for a substantial circumferential distance, i.e., greater than around 30°, whereby an efficient structure is provided.

It should also be noted that while the above has been described relative to the rear axle of an automotive vehicle, the sensor assembly 10 can be similarly advantageously employed with the front wheels.

While it will be apparent that the preferred embodiment of the invention disclosed is well calculated to fulfill the objects above stated, it will be appreciated that the invention is susceptible to modification, variation and change without departing from the proper scope or fair meaning of the subjoined claims.

What is claimed is:

1. For a wheeled vehicle an electrical rotational speed sensor for providing an electrical signal indicative of the rotational speed between a wheel and a support member supporting the wheel for rotation, the sensor comprising: a ring-shaped rotor, first means connecting said rotor for rotation with the wheel, a stator, means connecting said stator with the support member, said stator having a substantial number of teeth thereon extending for greater than around 30° and for substantially less than 360°, a core structure, a coil wound about said core structure and with said core structure comprising a permanent magnet, said stator comprising a stator plate member having an edge confronting said rotor with the teeth of said stator formed in said edge.

2. The sensor of claim 1 with the support member being a rear axle housing assembly and with said first means including an axle shaft.

3. For a wheeled vehicle an electrical rotational speed sensor for providing an electrical signal indicative of the rotational speed between a wheel and a support member supporting the wheel for rotation, the sensor comprising: a ring-shaped rotor, first means connecting said rotor for rotation with the wheel, a stator, means connecting said stator with the support member, said stator having a substantial number of teeth thereon extending for greater than around 30° and for substantially less than 360°, a core structure, a coil wound about said core structure and with said core structure comprising a permanent magnet, said stator comprising a stator plate having said stator teeth thereon and located on one side of said coil and a support plate located on the other side of said coil and means connecting said stator plate, said support plate and said coil together.

4. The sensor of claim 3 with said support plate having a smooth surface in confrontation with a smooth surface on said rotor and with said smooth surfaces being in the magnetic circuit of said magnet around said coil.

5. The sensor of claim 4 with the support member being a rear axle housing assembly and with said first means including an axle shaft.

References Cited

UNITED STATES PATENTS

| 2,159,333 | 5/1939 | Le Fevre et al. | |
|---|---|---|---|
| 2,304,866 | 12/1942 | Wall | 310—155 |
| 2,419,301 | 4/1947 | Tragesser | 310—155 |
| 3,158,033 | 11/1964 | Cohen | 310—168 X |

FOREIGN PATENTS

| 1,336,035 | 7/1963 | France. |
|---|---|---|

WARREN E. RAY, Primary Examiner

U.S. Cl. X.R.

310—181